UNITED STATES PATENT OFFICE.

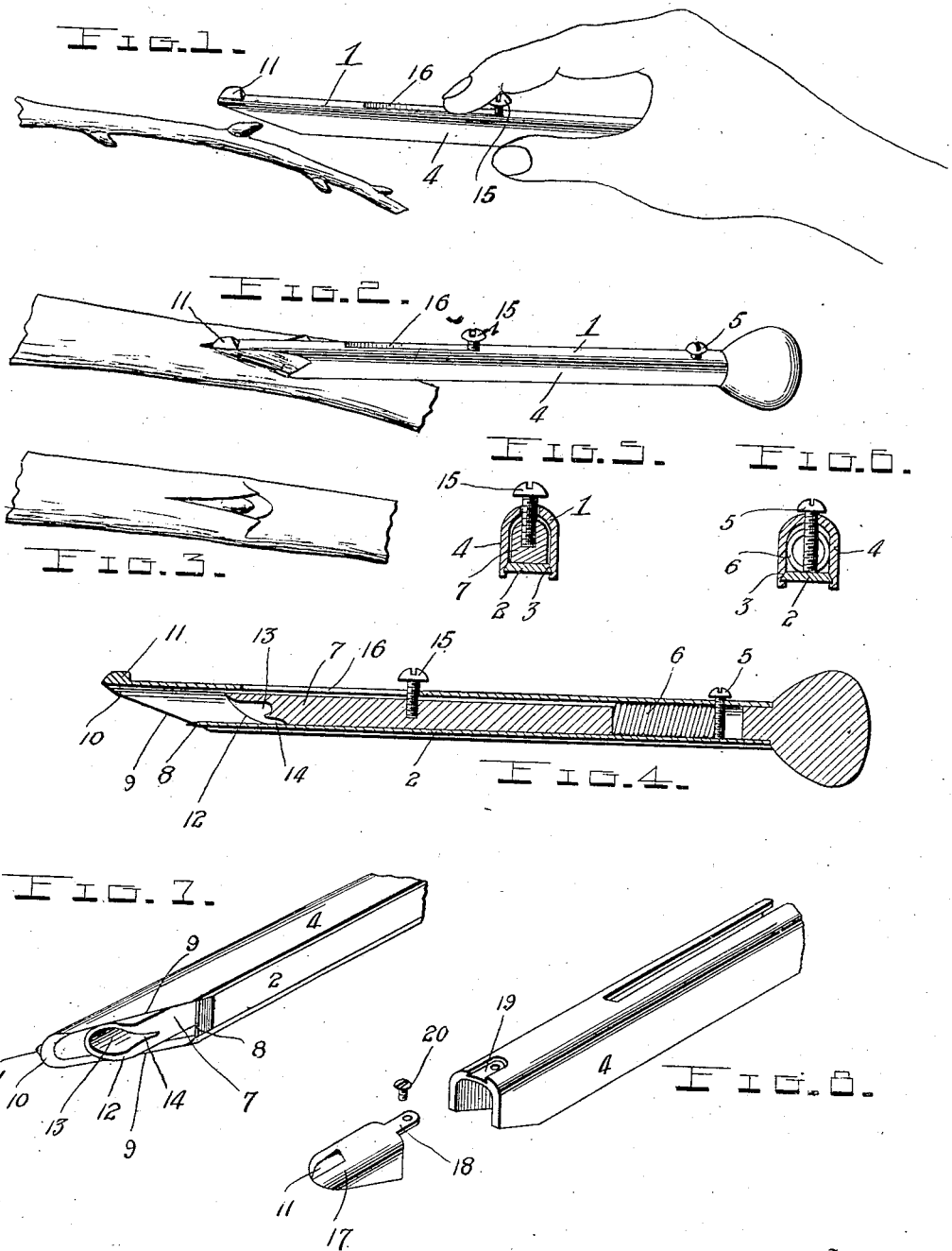

JAMES M. HALEY, OF SPRINGDALE, ARKANSAS, ASSIGNOR OF ONE-HALF TO FRANK F. YOUNG, OF SPRINGDALE, ARKANSAS.

GRAFTING-TOOL.

No. 870,096.   Specification of Letters Patent.   Patented Nov. 5, 1907.

Application filed July 25, 1907. Serial No. 385,527.

*To all whom it may concern:*

Be it known that I, JAMES M. HALEY, a citizen of the United States, residing at Springdale, in the county of Washington and State of Arkansas, have invented certain new and useful Improvements in Grafting-Tools, of which the following is a specification, reference being had to the accompanying drawings.

My invention relates to improvements in grafting implements or tools, and it consists in the novel features of construction and the combination of parts hereinafter described and claimed.

The object of the invention is to provide a simple, inexpensive and convenient device of this character by means of which a bud or scion may be readily cut and then inserted in an incision in a stem or branch of a plant or tree without injury to the bud.

The above and other objects are attained in the preferred embodiment of the invention illustrated in the accompanying drawings, in which Figure 1 is a perspective view of the device illustrating its use in cutting a bud or scion; Fig. 2 is a similar view showing the manner in which the incision in the stem or branch is made and the manner in which the cutting or scion is introduced in the incision; Fig. 3 is a view of the branch or limb with the cutting or scion in position; Fig. 4 is a longitudinal sectional view through the implement or tool; Figs. 5 and 6 are transverse sectional views; Fig. 7 is a detail perspective of the cutting end of the tool showing the bud or scion ejector in its projected position; and Fig. 8 is a detail perspective of a portion of the body of the tool and a removable incision cutting knife or blade.

My improved grafting tool or implement comprises a hollow or tubular body 1 preferably of U-shape in cross section and formed by bending a piece of metal upon itself, as more clearly seen in Figs. 5 and 6. The open under side or bottom of the body is closed by a plate 2 having its opposite beveled edges 3 slidably engaged with guide grooves formed in the inner faces of the parallel sides 4 of the body. The plate 2 is slid into position endwise of the body and is adjustably fixed by a set screw 5 which latter also serves as a stop for the spring 6 of a bud or scion ejector 7. The front end of the body is beveled downwardly and rearwardly, and the front end of the plate 2 terminates at the inner end of this beveled portion and is sharpened to provide a cutting edge or blade 8. This cutting blade 8 is adapted to cut the bud or scion and it is adapted to be guided in its operation by the beveled edges 9 of the sides 4, as presently explained. The concavo-convex nose or extremity 10 of the front end of the body is adapted to serve as the incision cutting blade or knife and its edges are beveled or sharpened, as clearly shown in Fig. 7. This incision knife has projecting from the center of its outer or convex side a longitudinally extending rib 11 having a beveled cutting edge which intersects the center of the edge of said knife. The ejector 7 is in the form of a slide shaped to fit the interior of the body and having its outer end beveled as at 12 and formed with a seat or recess 13 and with a groove or channel 14 leading from said seat and extending inwardly upon the bottom face of said ejector or slide. This seat 13 and the groove or channel 14 are adapted to receive the tender end of the bud and to protect the same against being bruised or mashed. The ejector slide is projected outwardly by the coil spring 6 which is confined in the body between the stop screw 5 and the inner end of the slide. The latter is adapted to be retracted and is limited in its sliding movement by a finger piece 15 in the form of a set screw inserted in a threaded socket in said slide and adapted to work in a longitudinal slot 16 formed in the top of the body.

If desired the incision blade or knife 10 may be formed separate from the body 1 of the tool and detachably secured to it, as shown in Fig. 8. This detachable knife 17 is provided with a tongue or shank 18 adapted to fit in a socket 19 formed in the body 1 and is retained in said socket by a set screw or similar fastening 20.

In using the tool, the handle at the rear end of the body is grasped in one hand and one of the fingers is engaged with the screw or finger piece 15 to move the ejector slide to its retracted position and hold it in such position; and the tool is then manipulated, as shown in Fig. 1, so that the blade or knife 8 will cut a bud and a small portion of the surrounding skin from the branch, twig, stem or the like. As the bud is cut it enters the tubular or hollow body and the tender portion of the bud is received in the recess and groove of the slide. The blade or knife 10 of the tool is then forced into the limb or branch upon which the bud or scion is to be grafted, in the manner shown in Fig. 2. When the knife has been forced in to the desired extent, the finger piece 15 is released so that the spring will actuate the slide to eject the bud from the tool and force it in to the incision. The tool is then removed from the incision, leaving the bud within the latter, as will be readily understood.

From the foregoing it will be seen that my improved grafting tool is exceedingly convenient in use and that it will quickly and effectively accomplish and perform its work without danger of bruising or injuring the bud.

Having thus described my invention what I claim is:

1. A tool of the character described comprising a tubular body having a beveled end provided with a curved outer portion and a straight transversely extending inner portion, the edge of the curved outer portion being sharpened to provide an incision cutting knife and said straight inner portion being sharpened to provide a bud cutting knife an ejector slidably mounted in the body, and a coil spring arranged in the body and engaged with one end of said ejector for projecting the opposite end of the latter out of the beveled end of the body, substantially as described.

2. A tool of the character described comprising a tubular body having a beveled end provided with a curved outer portion and a straight transversely extending inner portion, said outer portion being sharpened to provide a convex incision cutting blade and said straight inner portion being sharpened to provide a transverse bud cutting blade, an outwardly projecting cutting rib disposed upon and extending longitudinally of the outer portion of the beveled end of the body, the latter being also formed with a longitudinal slot, an ejector slidably arranged in the body and having a beveled outer end formed with a recess, a coil spring arranged in the body and engaged with one end of the ejector for projecting its opposite end out of the beveled end of the body, and a finger piece carried by the ejector and working in the slot in the body, substantially as described.

3. A tool of the character described comprising a body having a hollow or tubular portion provided with a beveled end, the inner portion of said end being straight and sharpened to provide the transverse bud cutting blade 8, substantially as described.

4. A tool of the character described comprising a tubular body having a beveled end provided with a rounded outer portion, said outer portion being sharpened to provide the convex incision cutting blade 10, and the outwardly projecting rib 11 arranged centrally upon and extending longitudinally of the outer portion of the beveled end of the body, substantially as described.

5. A tool of the character described comprising a body of U-shape in cross section, the sides of said body being formed upon their inner faces with opposing guide grooves, a blade slidably engaged with said guide grooves and adapted to close the open side of the body, a knife upon one end of the body, an ejector slidably arranged in the body, a coil spring in the body in rear of the ejector and engaged with the same, and a screw passed through a threaded opening in the curved side of the body and adapted to impinge against the inner face of said blade to hold the latter against movement, said screw being also engaged by said spring to form a stop for the same, substantially as described.

In testimony whereof I hereunto affix my signature in the presence of two witnesses.

JAMES M. HALEY.

Witnesses:
W. E. SIMPSON,
F. F. YOUNG.